United States Patent [19]

Fujiwara et al.

[11] Patent Number: 5,587,140
[45] Date of Patent: Dec. 24, 1996

[54] PROCESS FOR PRODUCING POWDERS OF TRANSITION METAL BORIDE

[75] Inventors: Shinji Fujiwara; Hiroshi Tabuchi; Akihiko Takahashi, all of Ibaraki, Japan

[73] Assignee: Sumitomo Chemical Company, Limited, Osaka, Japan

[21] Appl. No.: 442,503

[22] Filed: May 16, 1995

[30] Foreign Application Priority Data

May 18, 1994 [JP] Japan ................................ 6-103734

[51] Int. Cl.$^6$ .................................................. C01B 35/04
[52] U.S. Cl. ............................................................ 423/297
[58] Field of Search ..................................... 423/297, 289

[56] References Cited

U.S. PATENT DOCUMENTS

| | | | |
|---|---|---|---|
| 3,258,316 | 6/1966 | Tepper | 423/297 |
| 3,692,479 | 9/1972 | Meadows et al. | 423/440 |
| 4,312,848 | 1/1982 | Dawless | 423/297 |
| 4,414,188 | 11/1983 | Becker | 423/297 |
| 4,921,531 | 5/1990 | Nagle et al. | 423/297 |

FOREIGN PATENT DOCUMENTS

| | | | |
|---|---|---|---|
| 60-239321 | 11/1985 | Japan | 423/297 |
| 60-235717 | 11/1985 | Japan | 423/297 |
| 4-243913 | 9/1992 | Japan | 423/297 |
| 794146 | 4/1958 | United Kingdom | 423/297 |

OTHER PUBLICATIONS

"Handbook of Chemistry & Physics", 52nd edition, 1971–1972, pp. B–70 to B–76, QD 65 C4 (no month).
Journal of the American Ceramic Society, vol. 67, No. 3, Mar. 1984, pp. 207–212, Baumgartner et al. "Sintering and Properties of Titanium Diboride Made from Powder Synthesized in a Plasma–Arc Heater".
Journal of Materials Science 23, 1988, pp. 288–292, Tsuneaki Matsudaira et al, "Synthesis of $TiB_2$ powder from a mixture of TiN and amorphous boron".
The Research Report from the Faculty of Engineering, Kanagawa University, UDC: 661.685, vol. 23, Mar. 1985, pp. 37–44, Shigeru Okada et al, "Preparation of $TiB_2$ Single Crystal in Molten Aluminum Flux and its Properties".
Nippon Kagaku Kaishi (Journal of the Chemical Society of Japan, Chemistry and Industrial Chemistry), No. 8, 1995, pp. 1535–1543, Shigeru Okada et al, "Preparation of $NbB_2$, TaB and $TaB_2$ Single Crystals Using Molten Aluminum Flux" (no month).
Metall vol. 42. No. 12, Dec. 1988, pp. 1196–1200, K. Matiasovsky et al., "Electrolytic Deposition of Titanium Diboride—Possible Impact on Aluminum electrolysis" (A copy of p. 1197 is excluded because that page is a advertisement.

*Primary Examiner*—Ngoc-Yen Nguyen
*Attorney, Agent, or Firm*—Birch, Stewart, Kolasch & Birch, LLP

[57] ABSTRACT

A process of producing a powder of a transition-metal boride includes producing metal boride particles in a molten metal by contacting a molten salt, to which at least one boron compound was added, with the molten metal containing a transition-metallic element selected from the Groups IV and V of the Periodic Table at an atomic ratio of elemental boron to transition-metallic element from 0.5 to 4.0, while maintaining a contact temperature which is not lower than the melting point of the molten metal and which is less than 1000° C., and recovering the particles from the molten metal. According to the present invention, fine powders of the transition-metal boride which contain few agglomerated particles may be easily obtained using relatively inexpensive feed materials, such as the boron oxides, at a low temperature less than 1000° C. without the necessity of a grinding step.

6 Claims, No Drawings

PROCESS FOR PRODUCING POWDERS OF TRANSITION METAL BORIDE

BACKGROUND OF THE INVENTION

1. Field of the Invention

The present invention relates to a process for producing a powder of a transition-metal boride which has prominent characteristics such as high hardness, a high melting point, high corrosion resistance and good electrical conductivity.

2. Description of the Related Art

A transition-metal boride such as titanium diboride, tantalum diboride or the like is utilized in, for example, wear-resistant materials, corrosion-resistant materials, electrical contact materials and the like.

As an example of an industrial process for producing a powder of titanium diboride or tantalum diboride, there is a process in which a powder mixture of metal titanium and boron or a powder mixture of metal tantalum and boron is reacted with heating, a process in which a mixture of titanium oxide, boron oxide and carbon or a mixture of tantalum pentoxide, boron oxide and carbon is carbothermically reduced at a temperature around 1000° C., or a process in which a mixture of metal titanium, boron carbide and carbon or a mixture of metal tantalum, boron carbide and carbon is reacted at a high temperature around 2000° C.

However, since the powders of transition-metal boride such as titanium diboride produced by the above processes contain agglomerated large secondary particles formed by firmly attaching of primary particles, a grinding step has been required in order to obtain powders therefrom which have a desired particle size, for example, below 10 μm. However, it is difficult to carry out the grinding step since the transition-metal boride powder has a extremely high hardness.

Accordingly, in order to solve the above described problem, the following processes for the producing powders of transition-metal boride such as titanium diboride have been proposed.

As one process, it is known that a single crystal of a transition-metal boride such as titanium diboride is produced in a metal flux.

This process includes reacting a mixture of metal titanium, crystalline boron powder and aluminum chips as a metal flux under an argon atmosphere at a temperature in a range from 1000° to 1600° C. to produce the single crystal of titanium diboride, and the process is described in Research Report of Kanagawa University, Technology Faculty (No. 23, March, 1985). The single crystal obtained by the above process is a single crystal in the form of a thin plate-like (platelet) form of which the size is around 5 μm at a reaction temperature in a range from 1000° to 1300° C., and a large single crystal particle in the form of a hexagonal polyhedron of which the size is around 15 to 20 μm at a reaction temperature in a range from 1400° to 1500° C.

Another process is described in Bulletin of the Chemical Society of Japan, No. 8, page 1535 (1985) in which a mixture of metal tantalum, crystalline boron powder and aluminum chips as a metal flux is reacted under an argon atmosphere at a temperature in a range from 1150° to 1500° C. to produce single crystal of tantalum diboride. The single crystal obtained by this process is a single crystal particle in the form of a hexagonal polyhedron of which size is a few micrometers at a reaction temperature in a range from 1150° to 1400° C. and around 10 to 15 μm at a reaction temperature in a range from 1400° to 1500° C.

In the above processes, metal titanium or metal tantalum dissolves in the metal flux and gradually reacts with boron to produce single crystal particles of the transition-metal boride, and bonds between the obtained single crystals are weak so that a degree of agglomeration of the crystal particles is low. However, since the amount of boron dissolved in the metal flux is extremely small, unreacted boron tends to remain at a reaction temperature less than 1000° C. Therefore, a high temperature not lower than 1000° C. is required for the sufficient reaction.

In addition, the boron powder which is one of the feed materials to be used by addition to the metal flux is so expensive that the above processes can not be industrially efficient processes.

Then, a process was developed, in which a molten salt is used as a flux for dissolving a titanium compound and a boron compound to produce a powder of titanium diboride.

This process produces a titanium diboride powder by adding $K_2TiF_8$ and $KBF_4$ to molten salts of, for example, LiF—KF or KF—KCl, dissolving and electrolyzing them, which is disclosed in METALL, vol. 42, 1196 (1988). According to this process, the titanium diboride powder having a particle size in a range from 0.2 to 7 μm may be obtained at a reaction temperature of around 800° C. Not only does the addition and the dissolution of the titanium compound and the boron compound into the molten salts fail to produce the titanium diboride, but the electrolysis is also essential. Accordingly, this process can not be said to be an industrially efficient process.

Those conventional processes as described above have some disadvantages such as the necessity of expensive feed materials and the necessity of high reaction temperatures above 1000° C.

SUMMARY OF THE INVENTION

Therefore, it is an object of the present invention to provide a process to produce a fine powder of a transition-metal boride is highly desired, in which relatively inexpensive feed materials such as oxide of boron are used and the reaction temperature is so low to be less than 1000° C.

As a result of extensive studies of the present inventors for a process for producing powders of transition-metal boride which overcomes the above described problems, the present invention has been accomplished. The present invention is based on the observation that a powder of transition-metal boride is produced at a low temperature less than 1000° C. from relatively inexpensive feed materials such as oxides of boron by a process in which transition-metal boride particles are produced in a molten metal by using a molten salt together with the molten metal and then recovering the boride particles.

Therefore, the present invention provides a process for a producing powder of a transition-metal boride, which comprises producing transition metal boride particles in a molten metal by contacting a molten salt, to which a boron compound is added with the molten metal containing one transition-metal element selected from the Groups IV and V of the Periodic Table in an atomic ratio of boron element to transition-metal element from 0.5 to 4.0 at a temperature which is above a melting point of the metal for the molten metal and less than 1000° C., and recovering the particles from the molten metal.

DETAILED DESCRIPTION OF THE INVENTION

The present invention will be explained in detail hereinafter.

The metal used for the molten metal in the present invention is exemplified by a metal that has a low melting point, for example, magnesium or aluminum, and aluminum is preferred since it is easy to handle.

The molten metal preferably does not substantially contain any transition-metal element other than that of the constituent of the transition-metal boride. A purity of the molten metal, which is not particularly limited, is preferably 99.9% by weight or more, particularly 99.98% by weight or more.

An inorganic salt which is used as the molten salt in the present invention may be such salts that can dissolve the boron compound and the transition-metal element compound and are substantially unreactive with the molten metal. As a molten salt, it is preferred to use a mixture of inorganic salts provided that it is in the molten state at a reaction temperature of the present invention. In the molten state, the mixture of the inorganic salt has substantially little solubility with respect to the molten metal. This means that the phase of the molten salt and the phase of the molten metal are separated from each other at the reaction temperature according to the present invention. As a molten salt, a mixture of two or more fluorides selected from $AlF_3$, $NaF$, $KF$, $MgF_2$, $CaF_2$ and $BaF_2$ or a mixture of at least one fluoride and at least one chloride in which the fluoride is selected from $AlF_3$, $NaF$, $KF$, $MgF_2$, $CaF_2$ and $BaF_2$ and the chloride is selected from $KCl$, $MgCl_2$, $CaCl_2$ and $BaCl_2$ may be exemplified.

The purity of the fluoride or the chloride used for the molten salt is not particularly limited, and commercially available chemicals even containing a small amount of impurities may be used for producing transition-metal boride.

Though the composition of the molten salt is not particularly limited, the salt preferably comprises salts having a ratio of $NaF/AlF_3=3/1$ (namely, $Na_3AlF_6$) from the viewpoint of the ability to dissolve the transition-metal compound and the boron compound. Once the reaction temperature is set, the composition of the molten salt is selected by, for example, having an experiment conducted by one who is skilled in the art to determine the molten state at that temperature.

According to the present invention, particles of a transition-metal boride such as titanium diboride, zirconium diboride, tantalum diboride or niobium diboride are produced in the molten metal by contacting the molten metal containing the transition-metal element and the molten salt to which the boron compound is added, at a temperature at or above the melting point of the metal for the molten metal and less than 1000° C., or by contacting the molten salt, to which the compounds of the transition-metal element and boron are added, with the molten metal at a temperature at or above the melting point of the metal for the molten metal and less than 1000° C.

As the boron compound which is added to the molten salt, one or more compounds selected from oxides and chlorides of boron, for example, boron oxide ($B_2O_3$), boric acid ($H_3BO_3$), borax ($Na_2B_4O_7$), boron trichloride ($BCl_3$) and the like may be exemplified.

In the first place, the case in which the transition metal boride is produced in the molten metal by contacting the molten metal containing the transition-metal element with the molten salt to which boride is added will be described.

The transition metal element added to the molten metal is one selected from the Groups IV and V of the Periodic Table, which is exemplified by, for example, titanium, zirconium, tantalum or niobium.

Since such a boron compound easily dissolves in the molten salt at a low temperature less than 1000° C., elemental boron moves into the molten metal and reacts with transition-metal which is contained in the molten metal, the transition metal boride particles are obtained at a temperature less than 1000° C. which is lower than that of the conventional processes.

Next, in the case in which the transition metal boride is produced in the molten metal by contacting the molten salt, to which the compound of the transition-metal element and boron compound are added, with the molten metal will be described.

As the compound of the transition-metal element to be used, an oxide or a chloride, for example, titanium oxide ($TiO_2$), metatitanic acid ($H_2TiO_3$), zirconium oxide ($ZrO_2$), tantalum pentoxide ($Ta_2O_5$), niobium pentoxide ($Nb_2O_5$), titanium tetrachloride ($TiCl_4$), zirconium tetrachloride ($ZrCl_4$), tantalum pentachloride ($TaCl_5$), niobium pentachloride ($NbCl_5$) and the like may be exemplified.

In the present invention, the above described oxide or chloride of boron or the transition-metal may be either in powder form or in mass form as in a commercial product. For example, titanium oxide may be used in either crystalline form of a rutile or an anataze type of a commercial product.

As the chloride, for example, titanium tetrachloride or boron trichloride may be used in the form of a high-pressure gas which is commercially available.

The purity of the oxide or chloride is not particularly limited, and it does not affect considerably the production of the transition-metal boride in the molten metal even when a small amount of impurities is contained in the oxide or chloride.

As a manner of contacting the molten metal which contains the transition-metal element selected from the Groups IV and V of the Periodic Table with the molten salt to which boron compound is added in a reaction vessel, the following may be exemplified:

(1) charging simultaneously into a reaction vessel a metal in a mass form containing the transition-metal element and a salt, which is obtained by cooling and solidifying a molten salt, or a salt in the molten state to which a born compound has been added, at room temperature and then heating so as to melt the constituents which contact each other;

(2) adding a salt, which is obtained by boron cooling and solidifying molten salt, or a salt in the molten state to which boron compound has been added, to the molten metal containing the transition-metal element such that the constituents are in a molten state and in contact with each other;

(3) adding the molten metal or the metal containing the transition-metal element to the molten salt to which boron compound has been added so that the constituents are in a molten state and in contact with each other; or (4) charging into a reaction vessel a metal in mass form containing the transition-metal element and a salt, which has been obtained by cooling and solidifying molten salt, at room temperature and heated so as to melt the constituents which contact each other, and then adding boron compound to the molten salts. For example, when the boron compound is added to the molten salt, the molten phase salt exists as an upper layer and the molten phase metal exists as a lower layer which contacts the molten phase salt in the reaction vessel. Accordingly, a boron compound may be added to the top of the molten salt.

As a manner of contacting the molten salt which has been obtained by adding both the compound of the transition-metal element selected from the Groups IV and V of the Periodic Table and boron compound with the molten metal in a reaction vessel, the following may be exemplified:

(1) charging simultaneously into a reaction vessel a metal in mass form and a salt, which has been obtained by adding both the compound of the transition-metal element and boron compound to a molten salt and cooling and solidifying the molten salt, at room temperature and then heating so as to melt the constituents which contact each other; or (2) charging into a reaction vessel a metal in mass form and the salt, which has been obtained by cooling and solidifying only the molten salt, at room temperature and heating so as to melt the constituents which contact each other, and then adding both the transition-metal element compound and the boron compound to the molten salts.

Stirring the molten metal containing the transition-metal element and the molten salt to which boron compound has been added, or stirring the molten metal and the molten salt to which the compound of the transition-metal element and boron compound are both in liquid phases in a suspended condition, promotes an increase in the reaction interface area and transfer of the transition-metal element and/or elemental boron into the molten metal. Accordingly, stirring is preferred to produce the particles of the metal boride effectively.

The reaction temperature at which the particles of the transition-metal boride are produced in the molten metal is not lower than the melting point of the metal and less than 1000° C. For example, the reaction temperature is not lower than 650° C. and less than 1000° C. when magnesium is used as the molten metal, and the reaction temperature is not lower than 660° C. and less than 1000° C. when aluminum is used as the molten metal. Since volatilization of the molten salt increases at a temperature above 1000° C., a periodical replenishment of the molten salt is required so that such a temperature is not preferred.

As to the content of the transition-metal element and the content of elemental boron in the present invention, it is necessary that the atomic ratio of boron element to transition-metal element in the whole system is in a range from 0.5 to 4.0, preferably from 1.0 to 4.0, more preferably from 1.5 to 3.0. When the atomic ratio (boron element/transition-metal element) in the whole system is above 4.0, an excess amount of boron produces a metal boride in the molten metal. When the atomic ratio is less than 0.5, an excess amount of the transition-metal element reacts with the metal to produce a large amount of inter-metallic compounds. Therefore, it may be necessary to separate the other particles in order to obtain the intended transition-metal boride compound.

When the specific gravity of the molten salt is smaller than that of the molten metal, the molten salt phase floats on and contacts with the molten metal phase while the two phases are liquid-liquid separated during the reaction. In this case, the particles of the transition-metal boride produced in the molten metal sediment at the bottom of the molten metal are larger because of their specific gravity. Therefore, upon the selection of a combination of the inorganic salts for the molten salt and the molten metal, it is preferred to consider the specific gravities so that the specific gravity of the molten salt is relatively smaller than that of the molten metal.

Since the particles of the transition-metal boride sedimented at the bottom of the molten metal scarcely dissolve in the molten metal at a temperature less than 1000° C., crystal growth and/or crystal binding owing to dissolution-reprecipitation of the transition-metal boride particles scarcely occur when retained there for a long time.

As a manner of collecting the particles of the transition-metal boride thus produced, there may be exemplified a manner in which a lower portion of the molten metal containing many of the particles of the transition-metal boride is withdrawn from the molten metal, the particle content of the portion is concentrated by gravitational sedimentation or centrifugation and then the particles of the transition-metal boride are collected from the concentrated portion, or a manner in which the concentrated portion of the molten metal is cooled and solidified and then treated with, for example, an aqueous acidic or alkaline solution to dissolve and remove only the molten metal portion.

The insoluble residue obtained after the dissolution and removal of the molten metal portion is collected as the particles of the transition-metal boride after a treatment step, for example filtering, water washing and drying.

The aqueous acidic or alkaline solution used in the above procedure is not limited particularly, so long as it dissolves the molten metal and does not dissolve the particles of the transition-metal boride. For example, hydrochloric acid or sodium hydroxide aqueous solution may be used.

According to the process of the present invention, the particles of the transition-metal boride which scarcely contain the agglomerated particles may be easily obtained using relatively inexpensive feed materials such as the boron oxides at a low temperature less than 1000° C. without the necessity of a grinding step.

The powder of the transition-metal boride obtained by the process of the present invention has important industrial significance because it may also be used as dispersed reinforcing additives or abrasives in addition to ceramic materials for producing dense sintered articles.

EXAMPLES

The present invention will be hereinafter explained with reference to the following Examples, which do not limit the present invention in any way.

The following compositions were used as the molten salts in the Examples.

1. Composition for Molten Salt A (Boron Compound Addition)

40.0% by weight $Na_3AlF_6$ 44.0% by weight $AlF_3$ 15.0% by weight $CaF_2$ 1.0% by weight $B_2O_3$ 2. Composition for Molten Salt B 60.0% by weight $Na_3AlF_6$ 30.0% by weight $AlF_3$ 10.0% by weight $CaF_2$ 3. Composition for Molten Salt C (Boron Compound and Titanium Compound Addition)

40.0% by weight $Na_3AlF_6$ 44.0% by weight $AlF_3$ 14.0% by weight $CaF_2$ 1.0% by weight $B_2O_3$ 1.0% by weight $TiO_2$ The above compositions were prepared according to the following procedure.

Predetermined amounts of the chemical reagents $Na_3AlF_6$ (commercially available from Yoneyama Chemical Industries LTD.), $AlF_3$ (commercially available from Wako Pure Chemical Industries, LTD) and $CaF_2$ (commercially available from Kanto Chemical Co. Inc.) each having a reagent grade were mixed and then melted in a alumina-tammann tube at a temperature of 800° C. for 3 hours. If required, at the same temperature, the chemical reagents $B_2O_3$ (commercially available from Wako Pure Chemical Industries, LTD) and/or $TiO_2$ (anataze type, commercially available from Wako Pure Chemical Industries, LTD) each having a regent grade were added to the above molten fluoride and a resulted mixture was maintained such a temperature for further 3 hours so as to melt $B_2O_3$ and/or $TiO_2$.

After the tube was cooled, each composition for the salt was obtained.

Example 1

An aluminum alloy containing 0.5% by weight of titanium (50.60 g) as the molten metal and the composition for salt A containing 1.0% by weight of boron oxide (44.18 g) were charged in an alumina-tammann tube, heated up to a temperature of 900° C. under an argon gas flow and then the temperature was maintained for 5 hours so as to carry out the reaction. In this case, the atom ratio (B/Ti) of the whole reaction system was 2.4.

During the reaction, molten fluoride was observed floating on the molten aluminum alloy.

After cooling and solidifying, a mass of the fluoride on a mass of the aluminum alloy was mechanically removed and the lower aluminum alloy was collected. After the alloy was cut and a cut sectional surface was polished, polyhedron particles whose size is between 2 and 10 μm was observed at the bottom portion of the alloy with using a scanning electron microscopy (JSM-T220 type: commercially available from JEOL).

Then the bottom portion of the alloy was treated with 6N HCl so that only aluminum was dissolved and removed from the alloy so as to obtain a powder. The powder was substantially of only titanium diboride according to analysis result of X-ray diffractometry apparatus (RAD-2C: commercially available from Rigaku Corporation).

Example 2

An aluminum alloy containing 1.8% by weight of tantalum (53.26 g) and the composition of salt A containing 1.0% by weight of boron oxide (45.20 g) were charged in an alumina-tammann tube, heated up to a temperature of 900° C. under an argon gas flow and then the temperature was maintained for 5 hours so as to carry out the reaction. In this case, the atom ratio (B/Ta) of the whole reaction system was 2.4.

During the reaction, molten fluoride was observed floating on the molten aluminum alloy.

After cooling and solidifying, a mass of the fluoride on a mass of the aluminum alloy was mechanically removed and the lower aluminum alloy was collected. After the alloy was cut and a cut sectional surface was polished, polyhedron particles whose size is between 2 and 10 μm was observed at the bottom portion of the alloy with using a scanning electron microscopy (JSM-T220 type: commercially available from JEOL). The particles were tantalum diboride according to elemental analysis results of EPMA (Electron Probe X-ray Micro Analyser) (JXA-8600M: commercially available from JEOL).

Then the bottom portion of the alloy was treated with 6N HCl as described in Example 1 and powders of titanium diboride may be obtained.

Example 3

The composition for the salt C containing 1.0% by weight of boron oxide and 1.0% by weight of titanium oxide (67.48 g) and aluminum having its purity of 99.99% (52.36 g) were charged in a alumina-tammann tube, heated up to a temperature of 900° C. under an argon gas flow and then the temperature was maintained for 5 hours so as to carry out the reaction.

During the reaction, molten fluoride was observed floating on the molten aluminum.

After cooling and solidifying, masses of the fluoride floating on a mass of the aluminum was mechanically removed and the lower aluminum alloy was collected. After the bottom portion was cut and a cut sectional surface was polished, polyhedron particles whose size is between 2 and 10 μm was observed at the bottom portion of the alloy with using a scanning electron microscopy (JSM-T220 type: commercially available from JEOL). The particles were titanium diboride according to elemental analysis results of EPMA (JXA-8600M: commercially available from JEOL).

Comparative Example 1

An aluminum alloy containing 1.0% by weight of metal titanium (28.05 g) was charged in a alumina-tammann tube and heated up to a temperature of 800° C. under an argon gas flow. At this temperature, after 1.06 g of a boron oxide powder was added to the alloy, the mixture was heated up to a temperature of 900° C. and maintained at the temperature for 5 hours so as to carry out the reaction. In this case, the atom ratio (B/Ti) of the whole reaction system was 5.2.

During the reaction, molten boron oxide was observed floating on the molten aluminum alloy.

After cooling and solidifying, the lower aluminum alloy was collected. After the alloy was cut and a cut sectional surface was polished, no titanium diboride particle was observed with using a scanning electron microscopy (JSM-T220 type: a product of JEOL).

Comparative Example 2

A composition for salt B (66.97 g) was charged in a alumina-tammann tube and heated up to a temperature of 800° C. under an argon gas flow. At this temperature, boron oxide (2.00 g) was added to the composition to prepare a molten fluoride containing 2.9% by weight of boron oxide. In addition, an aluminum alloy containing 1.0 by weight of metal titanium (44.34 g) was added to the molten fluoride and the mixture was heated up to a temperature of 900° C. and then maintained at that temperature for 5 hours so as to carry out the reaction. In this case, the atom ratio (B/Ti) of the whole reaction system was 6.2.

During the reaction, molten fluoride was observed floating on the molten aluminum alloy.

After cooling and solidifying, a mass of the fluoride on a mass of the aluminum alloy was mechanically removed and the lower aluminum alloy was collected. After the alloy was cut and a cut sectional surface was polished, polyhedron particles having sizes from 1 to 5 μm and from 5 to 10 μm were observed at the bottom portion of the alloy with using a scanning electron microscopy (JSM-T220 type: commercially available from JEOL). These particles were titanium diboride and aluminum boride, respectively according to elemental analysis results of EPMA (JXA-8600M: commercially available from JEOL)

Comparative Example 3

Only composition for salt C containing 1.0% by weight of boron oxide and 1.0% by weight of titanium oxide (80.24 g) was charged in a alumina-tammann tube, heated up to a temperature of 900° C. under an argon gas flow, and then the composition was maintained at that temperature for 3 hours so as to carry out the reaction.

After the fluoride containing boron oxide and the titanium oxide was cooled to solidify and cut, the resulted cut surface was observed with using a scanning electron microscopy (JSM-T220 type: a product of JEOL). No titanium diboride particles in the fluoride was observed.

What is claimed is:

1. A process of producing a powder of a transition-metal boride, which comprises:

contacting a molten phase salt with a molten phase aluminum containing a transition-metal element selected from the group consisting of Groups IV and V of the Periodic Table, said molten phase salt comprising a fluoride and at least one boron compound selected from the group consisting of boron oxide, boric acid and borax, and said contact being carried out at an atomic ratio of boron compound expressed as elemental boron to the transition-metal element of from 0.5 to 4.0 at a temperature which is not lower than 660° C. and which is less than 1000° C. to produce transition-metal boride particles in the molten phase aluminum; and recovering the transition-metal boride particles from the molten phase aluminum.

2. The process of claim 1, wherein the transition-metal is titanium or tantalum, and the fluoride is a mixture of two or more compounds selected from the group consisting of $AlF_3$, NaF, KF, $MgF_2$, $CaF_2$ and $BaF_2$.

3. The process of claim 1, wherein the transition-metal is titanium or tantalum, and the molten phase salt is a mixture of one or more fluorides selected from the group consisting of $AlF_3$, NaF, KF, $MgF_2$, $CaF_2$ and $BaF_2$, and one or more chlorides selected from the group consisting of KCl, $MgCl_2$, $CaCl_2$ and $BaCl_2$.

4. A process of producing a powder of a transition-metal boride, which comprises:

contacting a molten phase salt with a molten phase aluminum, said molten phase salt comprising a fluoride, an oxide of a transition-metal element from the Groups IV and V of the Periodic Table and at least one boron compound selected from the group consisting of boron oxide, boric acid and borax, and said contact being carried out at an atomic ratio of the boron compound expressed as elemental boron to the transition-metal oxide expressed as the transition metal element of from 0.5 to 4.0 at a temperature which is not lower than 660° C. and which is less than 1000° C. to produce transition-metal boride particles in the molten phase aluminum; and recovering the transition-metal boride particles from the molten phase aluminum.

5. The process of claim 4, wherein the oxide of the transition-metal element is selected from the group consisting of titanium oxide, metatitanic acid and tantalum pentoxide, and the fluoride is a mixture of two or more compounds selected from $AlF_3$, NaF, KF, $MgF_2$, $CaF_2$ and $BaF_2$.

6. The process of claim 4, wherein the oxide of the transition-metal element is selected from the group consisting of titanium oxide, metatitanic acid and tantalum pentoxide and, the molten salt is a mixture of one or more fluorides selected from the group consisting of $AlF_3$, NaF, KF, $MgF_2$, $CaF_2$ and $BaF_2$ and one or more chlorides selected from the group consisting of KCl, $MgCl_2$, $CaCl_2$ and $BaCl_2$.

* * * * *